US007082142B1

(12) United States Patent
Begeja

(10) Patent No.: US 7,082,142 B1
(45) Date of Patent: Jul. 25, 2006

(54) SYSTEM AND METHOD FOR DELIVERING CONTENT IN A UNICAST/MULTICAST MANNER

(75) Inventor: Lee Begeja, Gillette, NJ (US)

(73) Assignee: AT & T Corp., New York, NY (US)

( * ) Notice: Subject to any disclaimer, the term of this patent is extended or adjusted under 35 U.S.C. 154(b) by 908 days.

(21) Appl. No.: 10/026,227

(22) Filed: Dec. 21, 2001

(51) Int. Cl.
 *H04J 3/06*  (2006.01)
 *H04J 3/00*  (2006.01)
 *H04L 7/00*  (2006.01)
 *H04L 7/02*  (2006.01)
 *H04N 7/173*  (2006.01)

(52) U.S. Cl. .................. 370/507; 370/521; 375/356; 375/359; 725/97

(58) Field of Classification Search ............ 725/93–97, 725/88, 90; 370/432, 270, 312, 389–391, 370/411, 503, 507, 509, 516–521; 375/354, 375/356, 359
See application file for complete search history.

(56) References Cited

U.S. PATENT DOCUMENTS 5,563,946 A * 10/1996 Cooper et al. ............... 705/56
6,091,705 A * 7/2000 Regula ...................... 370/223
6,512,776 B1 * 1/2003 Jones et al. ................. 370/432
6,543,053 B1 * 4/2003 Li et al. ....................... 725/88

OTHER PUBLICATIONS

The Split and Merge protocol for interactive video-on-demand☐☐Wanjiun Liao; Li, V.O.K.;☐☐Multimedia, IEEE☐☐vol. 4, Issue 4, Oct.-Dec. 1997 pp. 51-62.*
Design and analysis of multicast delivery to provide VCR functionality in video-on-demand systems☐☐Poon, W.-F.; Lo, K.-T.; Feng, J.;☐☐ATM, 1999. ICATM '99. 1999 2nd International Conference on☐☐Jun. 21-23, 1999 pp. 132-139.*

* cited by examiner

*Primary Examiner*—Chau Nguyen
*Assistant Examiner*—Kerri M. Dyke

(57) ABSTRACT

The present invention is a system and method for enabling multicast synchronization of initially unicasted content. Multiple unicast streams are synchronized in order to convert the unicast streams into a multicast stream. Each unicast stream may be accelerated or slowed down in relation to a reference stream to a common point within each stream upon which the unicast streams are replaced by a multicast stream of the same content.

17 Claims, 8 Drawing Sheets

SYSTEM AND METHOD FOR DELIVERING CONTENT IN A UNICAST/MULTICAST MANNER

BACKGROUND OF THE INVENTION

The present invention relates to content delivery, and more particularly to a system and method for enabling multicast synchronization of unicast information streams.

In conventional packet, frame or cell based systems there are typically two modes of communication: point-to-point (also known as Unicast) and point-to-multipoint (also known as Multicast). Generally, Unicast is communication between a single sender and a single receiver over a network as opposed to multi cast which is a communication between a single sender and multiple receivers.

Multicast is a receiver-based concept: receivers join a particular multicast session group and traffic is delivered to all members of that group by the network infrastructure. The sender or content provider does not need to maintain a list of specific receivers since only one copy of a multicast message will pass over any link in the network, and copies of the message will be made only where paths diverge at a router. Thus multicasting yields many performance improvements and conserves bandwidth end-to-end in the network.

Some examples of multicasting applications include the transmission of corporate messages to employees, communication of stock quotes to brokers, video and audio conferencing for remote meetings and telecommuting, and replicating databases and web site information. Multicasting efficiently supports these types of transmissions by enabling sources to send a single copy of a message to multiple recipients who explicitly want to receive the information. This is far more efficient than requiring the source to send an individual copy of a message to each requester such as is done in a unicasting manner, in which case the number of receivers is limited by the bandwidth available to the sender. It is also more efficient than broadcasting one copy of the message to all nodes (broadcast) on the network, since many nodes may not want the message, and because broadcasts are limited to a single subnet.

In spite of the various benefits affording by multicasting, unicasting has the unequalled benefit and flexibility of allowing users to select different types of content at their leisure and on their specific timeframes as opposed to being bound by the constraints of a multicast presentation. For example, typically, once a multicasting sessions begins, those who request to join the multicast sessions thereafter will only receive the multicasted content from the point on at which they joined as to opposed to having the content start from the beginning as in conventional unicasting.

Accordingly, it would be desirable to have a system and method which combines and integrates the various benefits and savings attributed to both unicasting and multicasting.

SUMMARY OF THE INVENTION

The present invention is a system and method for enabling multicasting of unicasted content thereby advantageously incorporating the flexibility of unicast delivery with the efficiency of multicast delivery. In one embodiment, the present invention is a method comprising receiving a plurality of requests for unicast transmission streams, providing the plurality of unicast transmission streams, synchronizing the plurality of unicast transmission streams and replacing the synchronized plurality of unicast transmission streams with a multicast stream.

In one embodiment, the present invention is a method comprising synchronizing a plurality of separate unicasts and converging the plurality of synchronized unicasts into a single multicast, wherein the unicasts have been converged at the same point within each unicast.

In another embodiment, the present invention is a method comprising delivering a plurality of point-to-point communications to a plurality of users, converting the plurality of point-to-point communications into a point-to-multipoint communication and delivering the point-to-multipoint communication to the plurality of users.

In yet another embodiment, the present invention is a method for multicasting initially unicasted information streams, the method comprising processing a plurality of unicast streams to converge the plurality of unicast streams and converting the plurality of converged unicast streams to a multicast stream, wherein the multicast stream replaces the plurality of unicast stream without interruption of the stream content.

DETAILED DESCRIPTION OF THE INVENTION

Figure 1:
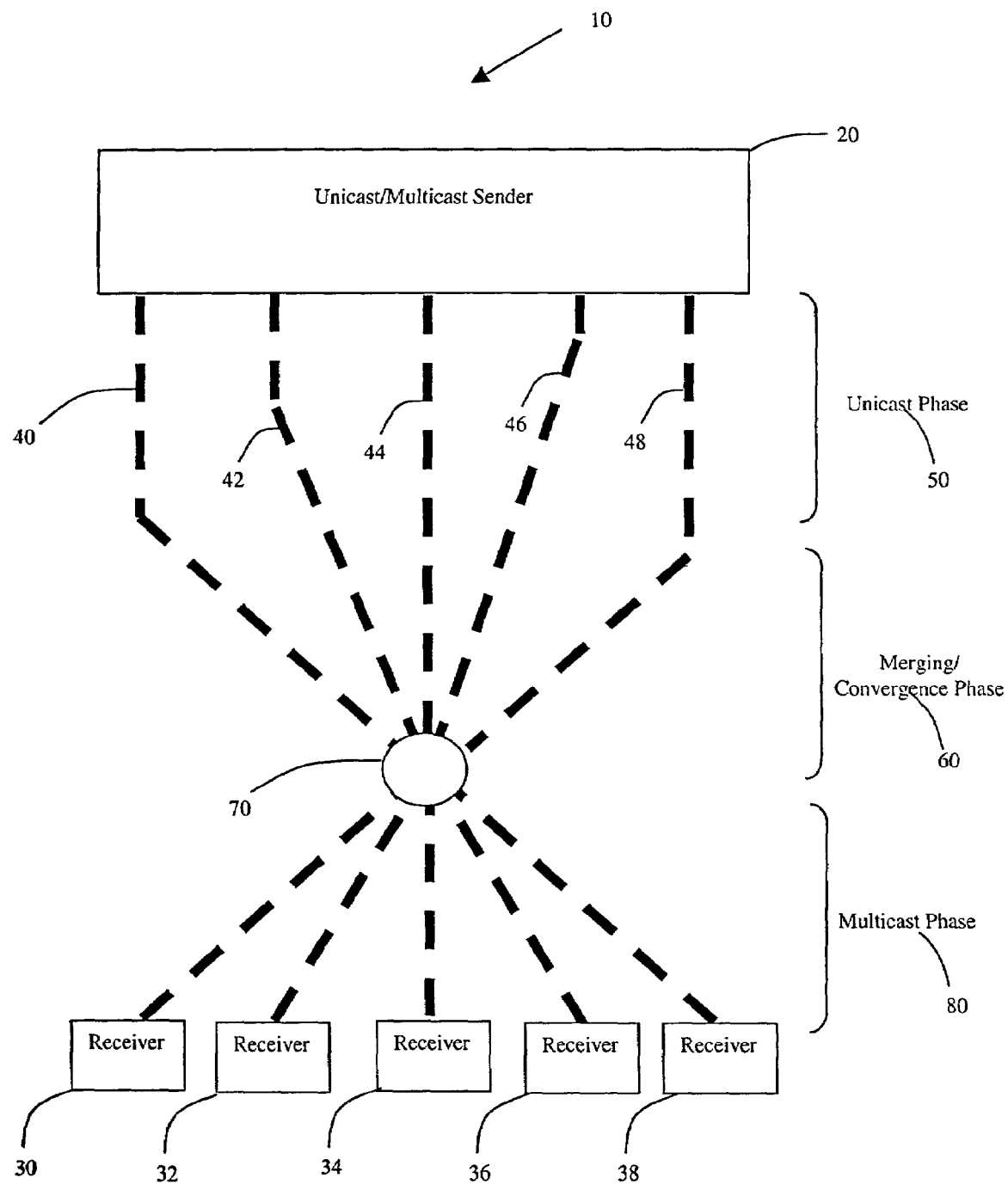
FIG. 1 illustrates an exemplary system configuration of the present invention.

With reference to FIG. 1, an exemplary system 10 is shown including, as way of illustration, an exemplary unicast/multicast sender 20 in communication with a number of exemplary receivers 30, 32, 34, 36 and 38. For illustrative purposes, five receivers are shown but it is contemplated that any number of receivers is possible herein, even amounts greatly exceeding five receivers. Exemplary receivers 30, 32, 34, 36 and 38 are adapted to receive multimedia content provided by unicast/multicast sender 20. As used herein, the term multimedia or multimedia content includes, although is not solely limited to, recorded and live video and audio clips and files, image files, digital music clips and files, movies, recorded books, archived television and radio programs, interactive multimedia netcasting, such as interactive netcasting of video, text, graphics, animation, music videos, television shows, movie trailers, and other multimedia. Unicast/multicast sender 20 and exemplary receivers 30, 32, 34, 36 and 38 are in communication via one or more networks, not shown, which preferably includes unicast and multicast compatible architecture including the appropriate servers and routers for facilitating unicast and multicast communications. In the present invention, one or more of the networks may be involved in the transmission and delivery of information between the senders and receivers such as a public shared IP network spanning many countries and covering thousands of IP sub-networks and other public and private Intranets. The receivers in the present invention may be any one or more of a variety of user devices/players which may include a personal computer, a Web enabled TV terminal/settop, a car audio player, a handheld media player such as an MP3 player or digital Walkman-type device, a PDA and any other device with the ability to receive and play any number of multimedia selections.

In the present invention, the transmission of information between senders and receivers is best performed by utilizing high bandwidth signals, such as signals containing digital representations of one or more movies, audio selections and related multimedia, between widely separated locations which is commonly done via special connections to high bandwidth transmission lines which are interconnected to form a point-to-point connection from a source or sender, such as a multimedia server to a receiver, such as a client personal terminal or device. Existing communication systems that provide such interconnection are now capable of supporting broadband data communication on both an inter-subscriber terminal basis (such as through an exchange) or on a client-server to subscriber terminal basis. In either case, both the subscriber terminal and the infrastructure equipment may contain a dedicated transmitter/receiver device, such as a modem. For example, current broadband access systems that provide interconnection may user use copper cabling (i.e. "twisted pair" technology), coaxial, fiber based cable or combinations thereof, and conventionally employ two transmitter/receiver devices, such as two broadband modems, one at each end of the connection.

Referring still to FIG. 1, exemplary receivers 30, 32, 34, 36 and 38 are adapted to communicate with sender 20 through their respective networks such as their respective access networks or Local Area Networks (LANs), as described earlier herein. One exemplary a connection may involve a broadband line, a T1/T3 line, Frame Relay (FR), ATM, an X.25 connection and/or a wireless connection of some sort. In accordance with the present invention, receivers 30, 32, 34, 36 and 38 will request a unicast information stream, such as information streams 40, 42, 44, 46 and 48 which are then provided to each requesting party or receiver by sender 20. During this initial phase or unicast phase 50, each of the information streams are provided or broadcast to each of the receivers in a unicast manner, e.g. a separate information stream is provided to each separate receiver. In accordance with the present invention and as described in more detail later herein, the various unicast information streams are merged or converged during a merging/convergence phase 60. Upon reaching a convergence point 70, the information streams are thereby provided in a multicast manner within multicast phase 80. Advantageously, once the information streams are merged and provided in a multicast manner, the network(s) performs the replication functions necessary so that each receiver can receive the requested information stream. It is contemplated that other receivers in addition to the ones shown may join the multicast in a conventional manner and receive the multicast stream.

Figure 2:
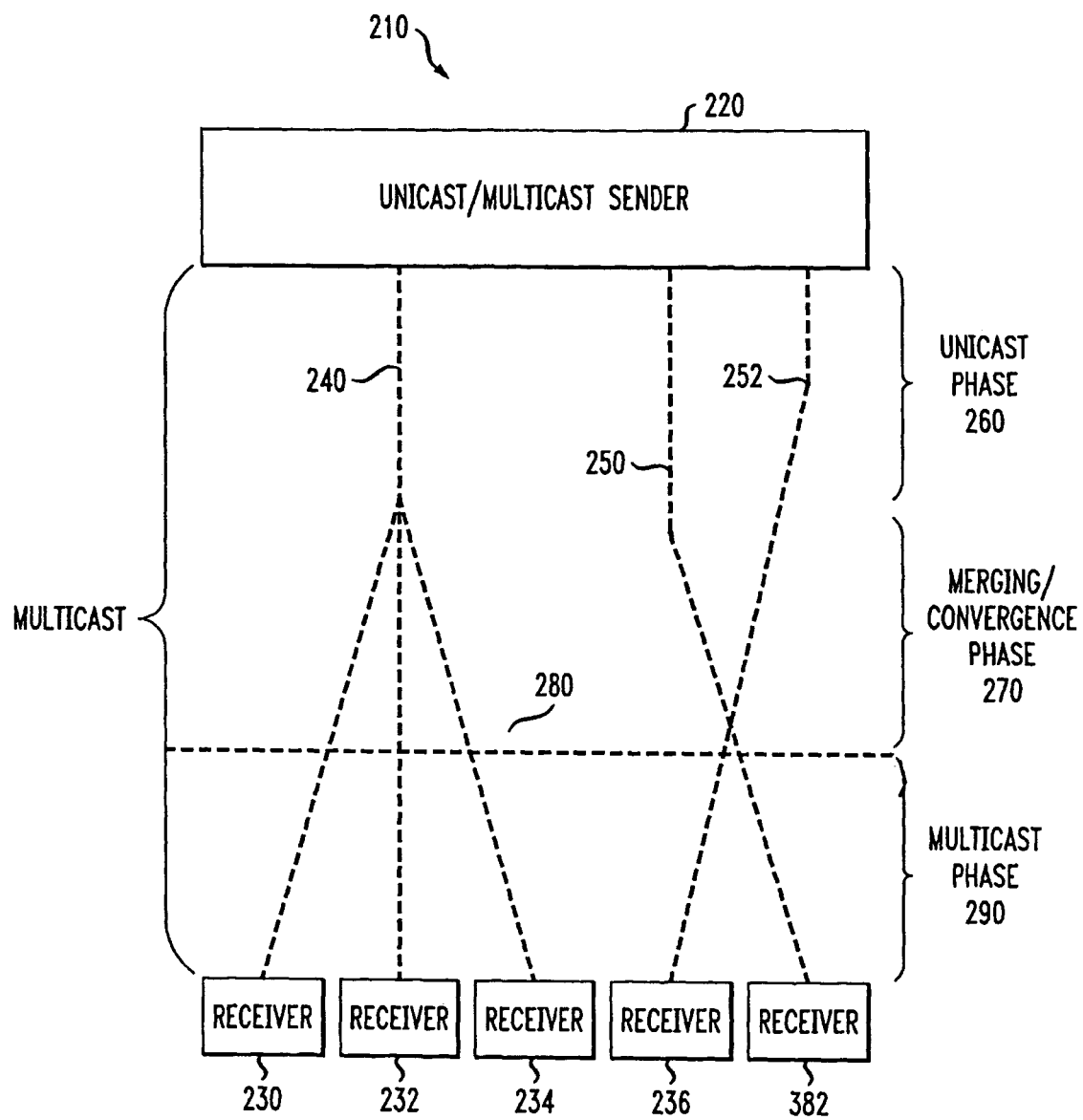
FIG. 2 illustrates another exemplary system configuration of the present invention.

Referring now to FIG. 2, another exemplary system configuration 210 is shown. In this embodiment, an exemplary unicast/multicast sender 220 is in communication with a number of exemplary receivers 230, 232, 234, 236 and 238. Exemplary receivers 230, 232, 234, 236 and 238 are adapted to communicate with sender 220 via unicast and multicast connections. In accordance with this embodiment of the present invention, receivers 230, 232, and 234 are receiving information via a multicasted information stream 240. In conjunction therewith, receivers 236 and 238 are initially receiving unicasted information via unicasted streams 250 and 252 during a unicast phase 260. During this initial phase or unicast phase 260, each of the information streams are provided or broadcast to each of the receivers in a unicast manner, e.g. a separate information stream is provided to each separate receiver. In accordance with the present invention and as described in more detail later herein, the various unicast information streams are merged or converged during a merging/convergence phase 270. Upon reaching a convergence point 280, the previously unicasted information streams are thereby provided in a multicast manner within multicast phase 290. In one embodiment, the unicast streams are merged into multicast stream 240 or alternatively, a separate multicast stream may be provided to receivers 236 and 238. Advantageously, once the information streams are merged and provided in a multicast manner, the network(s) performs the replication functions necessary so that each receiver can receive the requested information stream.

Figure 3:
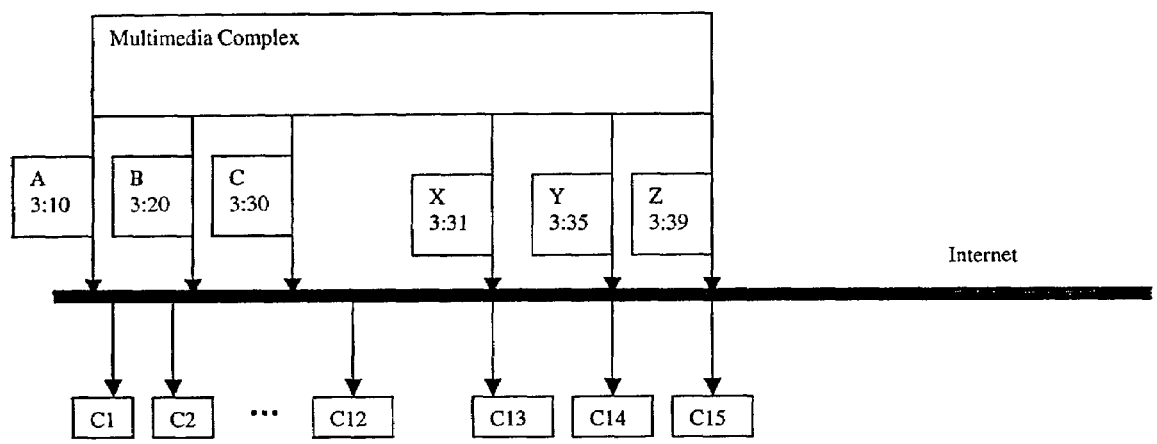
FIG. 3 illustrates an exemplary content delivery configuration of the present invention.
Figure 4:
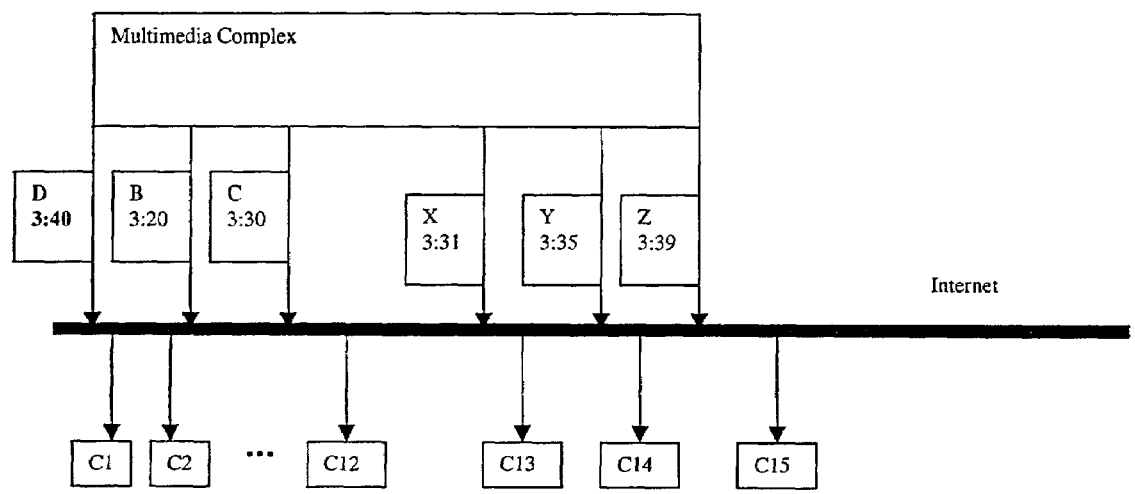
FIG. 4 illustrates an exemplary content delivery configuration of the present invention.
Figure 5:
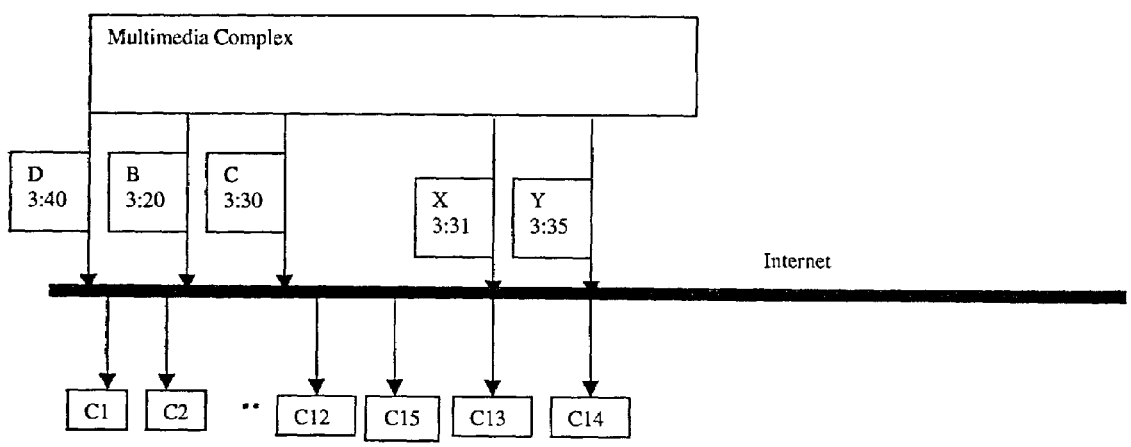
FIG. 5 illustrates an exemplary content delivery configuration of the present invention.

Referring to FIGS. 3–5, some exemplary content provisioning scenarios are shown which more fully illustrate the workings of the present invention. Referring to FIG. 3, a multimedia complex or server 300 is provided which has the capability to deliver multiple streams of a multimedia event, such as a video, audio or other related event. For exemplary purposes, multimedia server 300 is shown delivering six streams of a single thirty minute long multimedia event, multicast streams A, B and C and unicast streams X, Y and Z. These six streams serve fifteen exemplary customers, C1–C15. In this example, each of customers C1–C12 is viewing one of the three multicast streams A, B and C, while customer C13 views unicast stream X, customer C14 views unicast stream Y, and customer C15 views unicast stream Z.

Referring still to FIG. 3, it is assumed for exemplary purposes that stream A starts at a time of 3:10, stream B at 3:20, stream C at 3:30, stream X at 3:31, stream Y at 3:35 and stream Z at 3:39. For purposes of this exemplary embodiment, the multicast streams start at specific ten minute intervals while the unicast streams start at more random times. The times shown are merely provided for illustrative purposes only so that the teachings of the present invention can be more fully described. Referring now also to FIG. 4, assuming that the current time is 3:39 and that at 3:40 the multicast event being streamed at A (shown in FIG. 3 and having started at 3:10) will end and then a new stream D will start from the beginning, i.e. thereby maintaining a constant of three multicast streams. As one possible application, this invention could slow Unicast stream Z by a factor of approximately 10% which would bring it into sync with stream D in less than 10 minutes. For example, every minute that transpires, stream unicast stream Z would be $\frac{1}{10}^{th}$ closer in synchronization with stream D. If the stream being provided is, for example, contains a digitized movie, then unicast stream Z and multicast stream D would be on approximately the same frame or scene with the digitized movie within the span of approximately ten minutes. In accordance with the present invention, once the streams are synchronized or have met a certain convergence point, then unicast stream Z could be discontinued and customer C15 would be switched to watching multicast stream D, as shown in FIG. 5.

n the present invention, any speed up or slow down in the speed of any content provided to a user, such as a multimedia presentation, is preferably be done with consideration of the user experience. While any change in speed is technically possible the best experience for the customer comes from a change that is not noticeable. Different material would have different tolerances to changes in speed of presentation. It is conceivable that a percentage change in speed in the range of approximately 1 to 10% may be applicable in many circumstances but theoretically, any change is speed is possible, so long as the user experience is not adversely affected.

In accordance with the present invention and as described with reference to FIGS. 1–5, the entities requesting content from the multimedia server, such as any number of clients, customers or users are connected to a network and are capable of joining in and participating with a uni/multicast session on the network. It is contemplated that the clients, customers or user are connected to the network through an Internet connection having access to conventional netcasting routers thus enabling Unicast and Multicast IP communications between the clients, customers or users and the provider of the content, such as the multimedia server. The clients, customers or users may be connected to network or networks over a Plain Old Telephone Service (POTS) dial-up connection, an ISDN connection or an Asynchronous Digital Subscriber Loop (ADSL) connection, each to a Local Exchange Carrier (LEC) (not shown) and from there to an Internet Service Provider (ISP) (not shown), which in turn is connected to the IP network through an appropriate router. Alternatively, a client, customer or user can be connected to an ISP through a cable modem over cable facilities through a cable TV provider. Even further, the client, customer or user could be connected to a LAN and to a customer premises router to a UR over, for example, a Wide Area Network (WAN), T1 facilities, Frame Relay, ATM, or X.25. Of course other possible connections and combinations of connections are possible so long as transmission from a content service provider, such as a multimedia server, to the appropriate content requestor is enabled.

Figure 6:
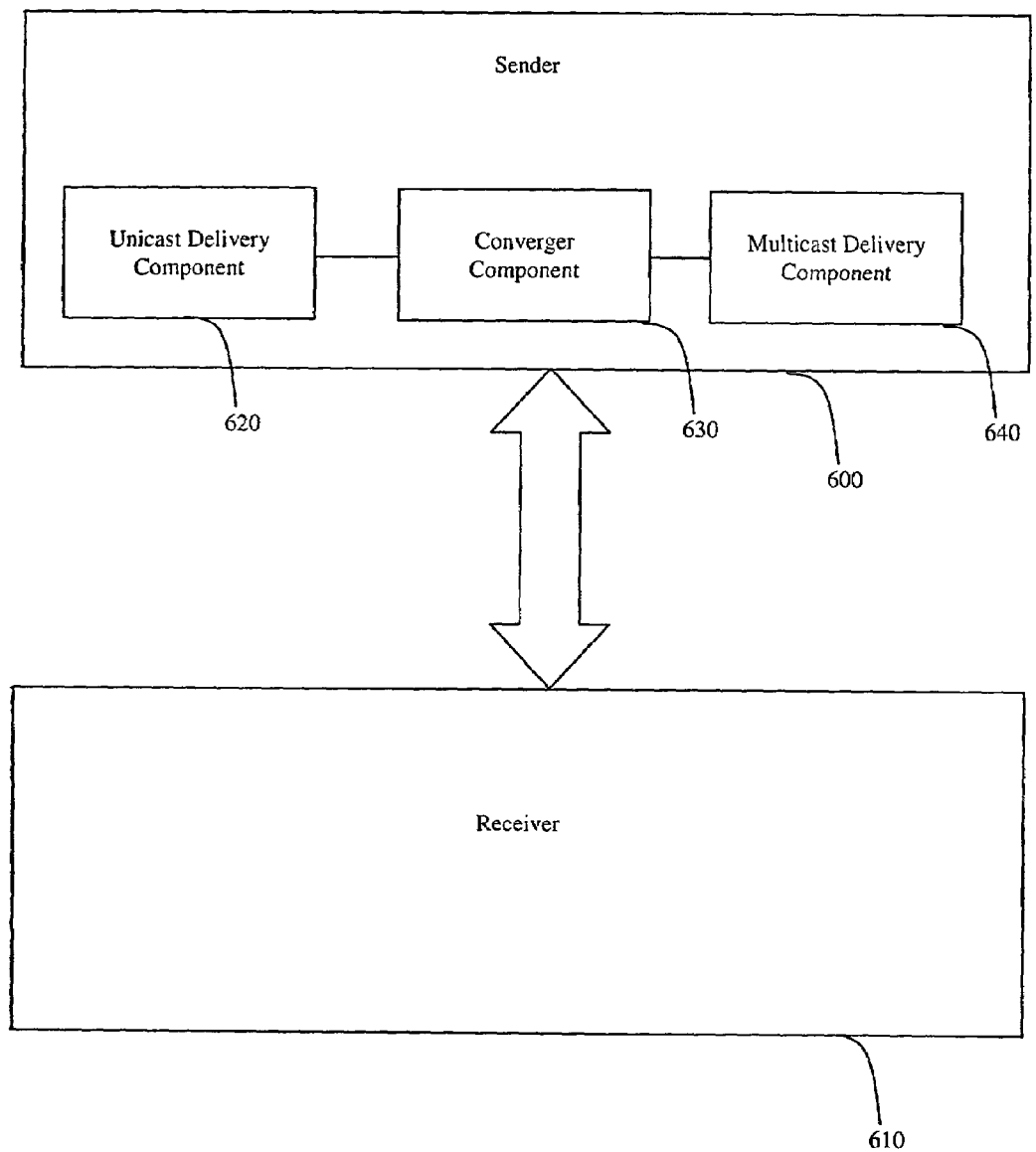
FIG. 6 illustrates an exemplary sender configuration of the present invention.

Referring to FIG. 6, an exemplary configuration for a multimedia server or sender is shown. Exemplary sender 600 may include a unicast component 620, a converger component 630 and a multicast delivery component 640 which function and provide in a number of manners, such as a content delivery mechanism and as a transition mechanism that enables those initially Unicast-connected clients on their respective Unicast IP networks to access the Multicasted content on the network. Such a transition may be enabled via converger component 630 which may calculate the necessary stream modifications necessary to synchronize the unicast stream(s) to the multicast stream(s). Sender 600 may also enable users to join a group on the network by providing information relating to what multicast sessions are in progress or scheduled on the network by receiving and sending data on those groups within a session. In the present invention, it is contemplated the sender 600 may handle a theoretically unlimited amount of users between users that have established initial unicast delivery sessions and those that are eventually merged or converged into multicast delivery sessions, subject to the constraints and limitations of the network(s) involved. In one embodiment of the present invention, unicast delivery component 620, converger component 630 and multicast delivery component may be implemented as software running in conjunction with any number of general or specialized computer processors to implement the steps and methods described herein for delivering and synchronizing content delivery over a network. In one embodiment of the present invention the converger component could reside with the sender 600 or with the receiver 610 or as part of the network provided the ability to communicate with the unicast and multicast delivery components is maintained.

Figure 7:
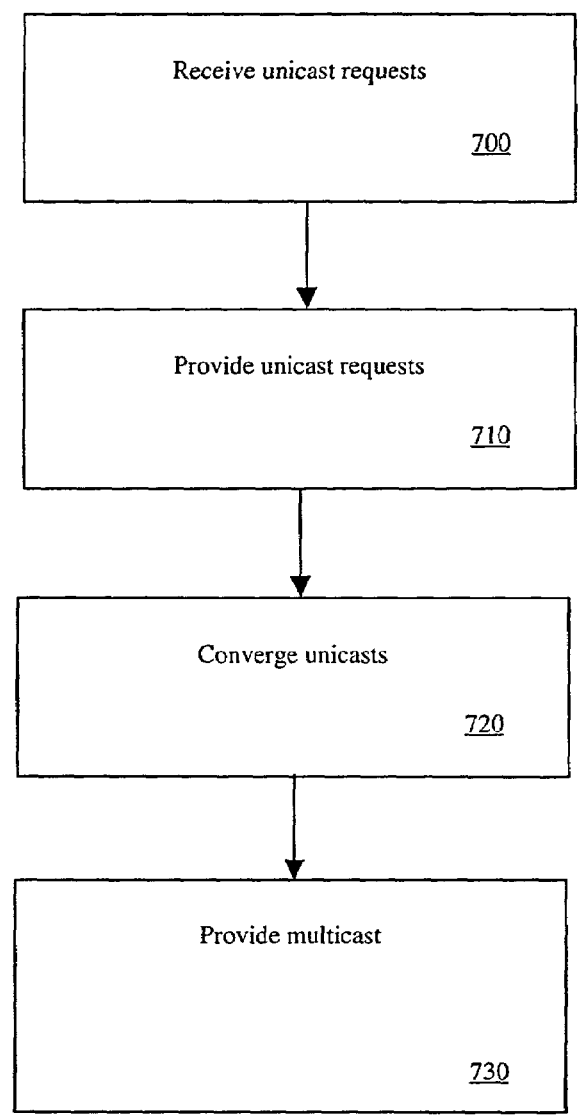
FIG. 7 illustrates another exemplary method of the present invention.

Referring now to FIG. 7, an exemplary method for providing content in a both a unicasting and multicasting manner is shown. In one embodiment, a number of unicast requests are received, step 700. The received unicast requests are fulfilled by providing the requested unicast content to the requesters or users via unicast streams, step 710. The unicast streams are then synchronized or converged, step 720. The converged streams are then provided in a multicast format to the initial requesters in a manner transparent to the users but more efficient and scalable in a network perspective, step 730. It is contemplated that in step 720, if there are multiple unicast streams, not all of the unicast streams may be able to be converged in a manner transparent to the user. In such a case, only those unicast streams that can be readily and transparently scaled up or scaled down to reach a suitable convergence point before converting the streams to a multicast format will be undertaken, such as described earlier herein with respect to FIGS. 3–5.

Figure 8:
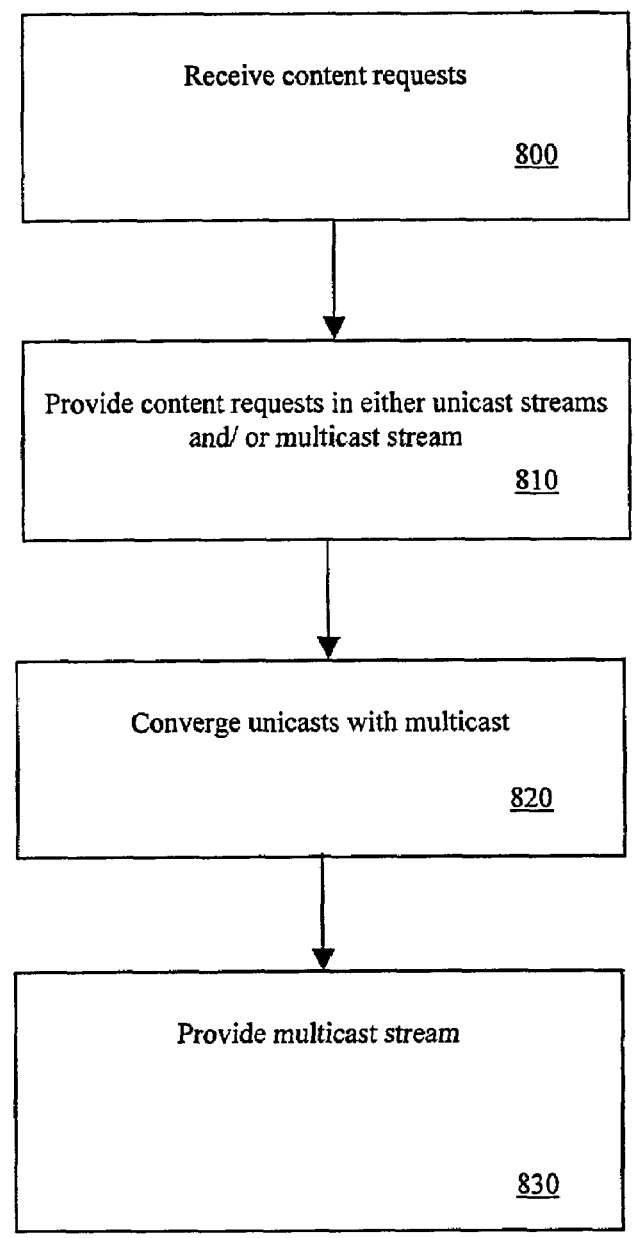
FIG. 8 illustrates yet another exemplary method of the present invention.

Referring now to FIG. 8, another embodiment of a method of the present invention is shown. In this embodiment, a number of content requests are received, step 800. The requested content may then be provided by either delivering unicast streams and/or multicast streams to the requesters or users, step 810. Once a number of streams are being delivered, one or more of the unicast streams are merged with one or more of the multicast streams, step 820. The content is then delivered in both a unicast and multicast stream format, step 830, provided that any unicast streams are necessary at all. It is contemplated and preferred that in step 830, the number of unicast and multicast streams provided in step 830 will be less than the original amount of streams provided in step 810 given that one or more of the unicast streams will have been consolidated into a multicast format.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention

What is claimed is:

1. A method comprising:
   receiving a plurality of requests for unicast transmission streams;
   providing the plurality of unicast transmission streams;
   synchronizing the plurality of unicast transmission streams, wherein synchronizing the plurality of unicast transmission streams is performed by slowing down one or more of the unicast streams at a rate that depends on when the request for the unicast transmission stream is received; and
   replacing the synchronized plurality of unicast transmission streams with a multicast stream.

2. The method of claim 1, wherein a single movie provider and a single movie theater share a single encryption key not shared by any other movie provider and movie theater.

3. The method of claim 1, wherein the plurality of unicast transmission streams contain a single pre-recorded event.

4. The method of claim 1, wherein the plurality of unicast transmission streams are started at different times.

5. A method, comprising:
synchronizing a plurality of separate unicasts, wherein synchronizing the plurality of separate unicasts includes differentially adjusting a delivery rate of each unicasts so that the unicasts converge at similar point within a predetermined time frame; and
converging the plurality of synchronized unicasts into a simple multicast, wherein the unicasts have been converged at the same point within each unicast by slowing down one or more of the unicast streams at a rate that depends on when the request for the unicast stream is received.

6. The method of claim 5, further comprising:
delivering the plurality of separate unicasts to a plurality of unicast recipients.

7. The method of claim 5, further comprising:
receiving a plurality of requests for the unicast from a plurality of unicast requesters.

8. The method of claim 5, wherein converging the plurality of synchronized unicasts into a single multicast comprises:
terminating each of the plurality of synchronized unicasts; and
replacing each of the terminated plurality of synchronized unicasts with a multicast.

9. The method of claim 5, wherein converging the plurality of synchronized unicasts into a single multicast, wherein the single multicast replaces the plurality of unicasts.

10. A method, comprising:
synchronizing a plurality of separate unicasts, wherein synchronizing the plurality of separate unicasts includes dynamically altering each unicast in an undetectable manner so that each of the plurality of unicasts converge at a similar point within each unicast; and
converging the plurality of synchronized unicasts into a simple multicast, wherein the unicasts have been converged at the same point within each unicast by slowing down one or more of the unicast streams at a rate that depends on when the request for the unicast stream is received.

11. The method of claim 10, further comprising:
delivering a plurality of separate unicasts to a plurality of unicast recipients.

12. The method of claim 10, further comprising:
receiving a plurality of requests for the unicast from a plurality of unicast requestors.

13. The method of claim 10, wherein converging the plurality of synchronized unicasts into a single multicast comprises:
terminating each of the plurality of synchronized unicasts; and
replacing each of the terminated plurality of synchronized unicasts with a multicast.

14. The method of claim 10, wherein converging the plurality of synchronized unicasts into a single multicast, wherein the single multicast replaces the plurality of unicasts.

15. A method, comprising:
synchronizing a plurality of separate unicasts; and
converging the plurality of synchronized unicasts into a simple multicast, wherein the unicasts have been converged at the same point within each unicast by slowing down one or more of the unicast streams at a rate that depends on when the request for the unicast stream is received and by determining when the plurality of unicasts have converged to the same point; and
converting each of the plurality of unicasts into a single multicast.

16. The method of claim 15, further comprising:
delivering the plurality of separate unicats to a plurality of unicast recipients.

17. The method of claim 15, further comprising:
receiving a plurality of requests for the unicast from a plurality of unicast requestors.

\* \* \* \* \*